United States Patent [19]

Anderson

[11] 4,155,282

[45] May 22, 1979

[54] MECHANISM FOR CUTTING SHEETS FROM A CONTINUOUS WEB OF FILM

[75] Inventor: Andrew W. Anderson, West Caldwell, N.J.

[73] Assignee: Scandia Packaging Machinery Co., Clifton, N.J.

[21] Appl. No.: 882,278

[22] Filed: Feb. 28, 1978

Related U.S. Application Data

[63] Continuation of Ser. No. 707,074, Jul. 20, 1976, abandoned.

[51] Int. Cl.[2] .............................................. B23D 5/12

[52] U.S. Cl. ........................................ 83/300; 83/346; 83/348; 83/677; 93/1 TS

[58] Field of Search ................. 83/300, 303, 299, 346, 83/347, 348, 344, 677; 93/1 TS

[56] References Cited

U.S. PATENT DOCUMENTS

| | | | |
|---|---|---|---|
| 1,856,659 | 5/1932 | Sandfanander | 83/346 X |
| 2,837,978 | 6/1958 | Anderson | 83/332 X |
| 3,333,497 | 8/1967 | Eyebrger | 83/263 X |
| 3,379,598 | 4/1968 | Petri | 93/1 TS |

FOREIGN PATENT DOCUMENTS

| | | | |
|---|---|---|---|
| 1252937 | 12/1960 | France | 83/348 |

*Primary Examiner*—J. M. Meister

*Attorney, Agent, or Firm*—Neil F. Markva

[57] ABSTRACT

A cutting mechanism includes a removably mounted backing roller having a longitudinal axis of rotation and a rotatably mounted cutting member having a cutting edge and a longitudinal axis of rotation disposed parallel to the axis of rotation for the roller member. The roller member rotates in a fixed relationship with respect to the cutting member so that the cutting edge operates at substantially the same surface location of the circumferential surface of the backing roller to cut film thereagainst upon each revolution of the cutting member. The roller member is mounted to resiliently float in a direction transverse to a plane extending through the axis of rotation for the cutting member. The drive of the rotating elements is effected through the use of a timing belt operating from the main drive of the machine on which the cutting mechanism is mounted.

8 Claims, 6 Drawing Figures

Fig. 5
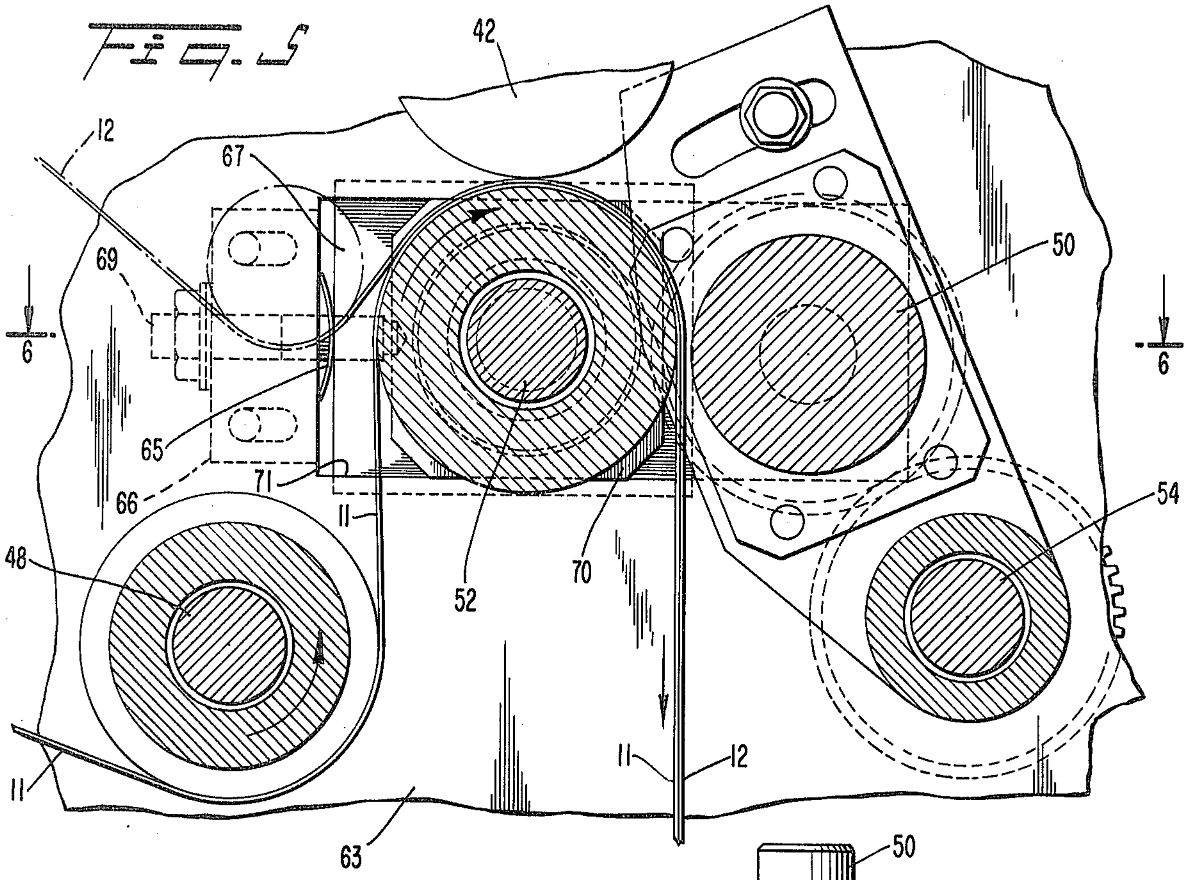
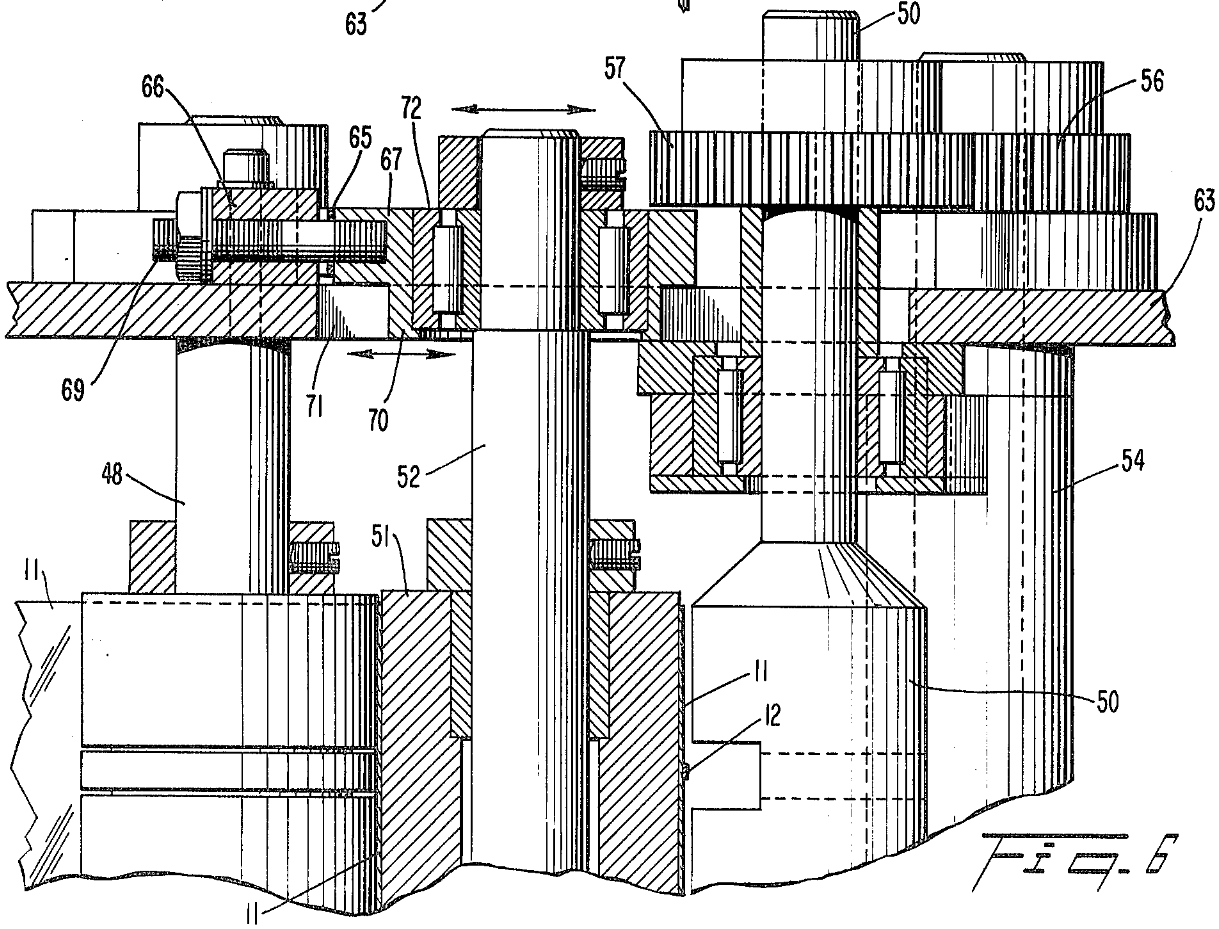
Fig. 6

MECHANISM FOR CUTTING SHEETS FROM A CONTINUOUS WEB OF FILM

This is a continuation, of application Ser. No. 707,074 filed July 20, 1976, now abandoned.

BACKGROUND OF THE INVENTION

This invention relates to feeding and cutting mechanisms for wrapping machines. More particularly, the invention is directed to the mechanism for cutting a sheet from a continuous supply web, and superimposing a tear tape thereon. The combination is then wrapped around an article or package.

The sheet feeding and cutting mechanism disclosed in U.S. Pat. No. 2,837,978 was used with film material such as cellophane. The film thickness of the web material was about 0.001 inch. The disclosure of the earlier patent represents the present state of the art. The said patent is hereby incorporated by reference with its teaching becoming a part of this disclosure.

For various reasons peculiar to the packaging industry, many new types of thin film have been developed. These include polyethylene, polypropylene, polyesters and others which come in very thin thicknesses and with different cutting characteristics than the cellophane films previously used. The film thickness is now down to about 0.0008 inch or about a 20% decrease. Greater knife penetration is required to cut the new film. Generally, a 40% penetration is required for cellulose and up to 80% penetration is required for some polyfilms having a thickness of about 0.0005 inch. These physical relationships become more critical due to the high speed operation necessary to meet current production demands.

The prior art mechanism is gear driven and provides a rigid or fixed relationship between the moving parts of the cutting head mechanism. A knife is rotatably mounted adjacent a rotatable platen or backing roller. The web and tear strip combination passes between the knife and the roller. Cuts are made parallel to and across the tear strip. These cuts are made by an H-knife, a U-knife or separate knife edges disposed parallel to and transverse to the tear strip.

Under present manufacturing conditions, concentric tolerances for the backing roller must be maintained at ±about 0.0002 or less. Consequently, eccentricity within these tolerances becomes a problem when using the extremely thin films as discussed above.

The backing roller and rotatably mounted cutting knife are driven in the prior art mechanism. However, the rotating relationship between the knife and the backing roller is irregular. That is, the knife cuts the web and/or tear strip at a different location on the circumferential surface of the backing roller each time. It has been discovered that because of the inherent eccentricity in the backing roller, the prior art structure is subject to excessive wear and maintenance problems. There is also a problem when the cutting edge of the knife wears that the cutting edge is no longer effective in cutting the film.

PURPOSE OF THE INVENTION

The primary object of the invention is to provide an improved web and tear strip feeding and cutting mechanism that can handle existing thin film materials.

Another object of the invention is to provide a feeding and cutting mechanism having a longer service life and requiring significant reduction in maintenance costs.

A further object is to provide a cutting mechanism which automatically compensates for wear on the cutting edges of the knife.

SUMMARY OF THE INVENTION

These objects and other advantages will be accomplished through the use of the cutting mechanism as described herein. The cutting mechanism includes a removably mounted backing roller means and a rotatably mounted cutting means. The longitudinal axis of the roller and cutting means are disposed parallel with respect to each other. The mechanism is provided for rotating the roller and cutting means in a fixed relationship with each other to cause the cutting edge to cut at substantially the same surface location along the circumferential surface of the backing roller upon each revolution of the cutting member. The backing roller is mounted to resiliently float in a direction transverse to a plane extending through the axis of rotation for the cutting means.

Another feature of the invention is the use of a timing belt for driving the backing roller means and the cutting means on a one-to-one relationship. Alternatively, a multiple of a one-to-one relationship from the main drive of the apparatus on which the cutting and feeding head mechanism is mounted may be used.

In a specific embodiment of this invention, the cutting and feeding mechanism is mounted to vertically feed sheets of thin film into a wrapping machine. The head mechanism of this invention may be used with a U-shaped knife or an H-shaped knife. A single cutting edge having either a U-shape or H-shape may be used. However, separate transverse and longitudinal cutting members may also be used. The backing rollers are mounted to be interchanged. Thus, the circumference of the backing roller is adaptable to be equal to the length of sheet being cut from the continuous web of material being fed. The invention contemplates the use of a set of backing rollers having various diameters for matching a desired sheet length being used.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 5 is a fragmentary sectional view through the backing roller mounted to resiliently float within the cutting and feeding mechanism of this invention, FIG. 6 is a fragmentary sectional view taken along line 6—6 of FIG. 5.

DESCRIPTION OF SPECIFIC EMBODIMENTS

Figure 1:
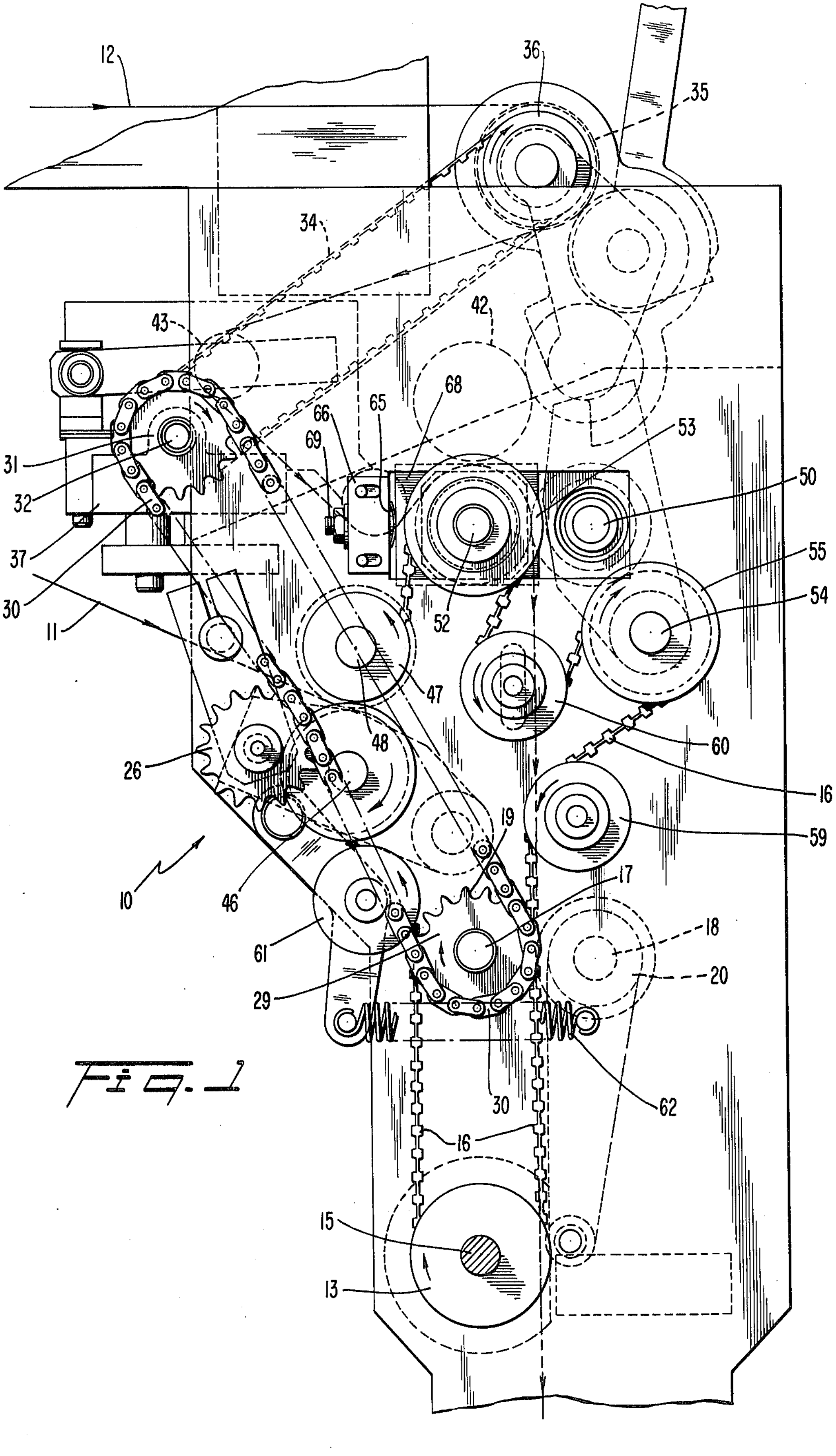
FIG. 1 is a fragmentary elevational view of a feeding and cutting mechanism made in accordance with this invention.
Figure 2:
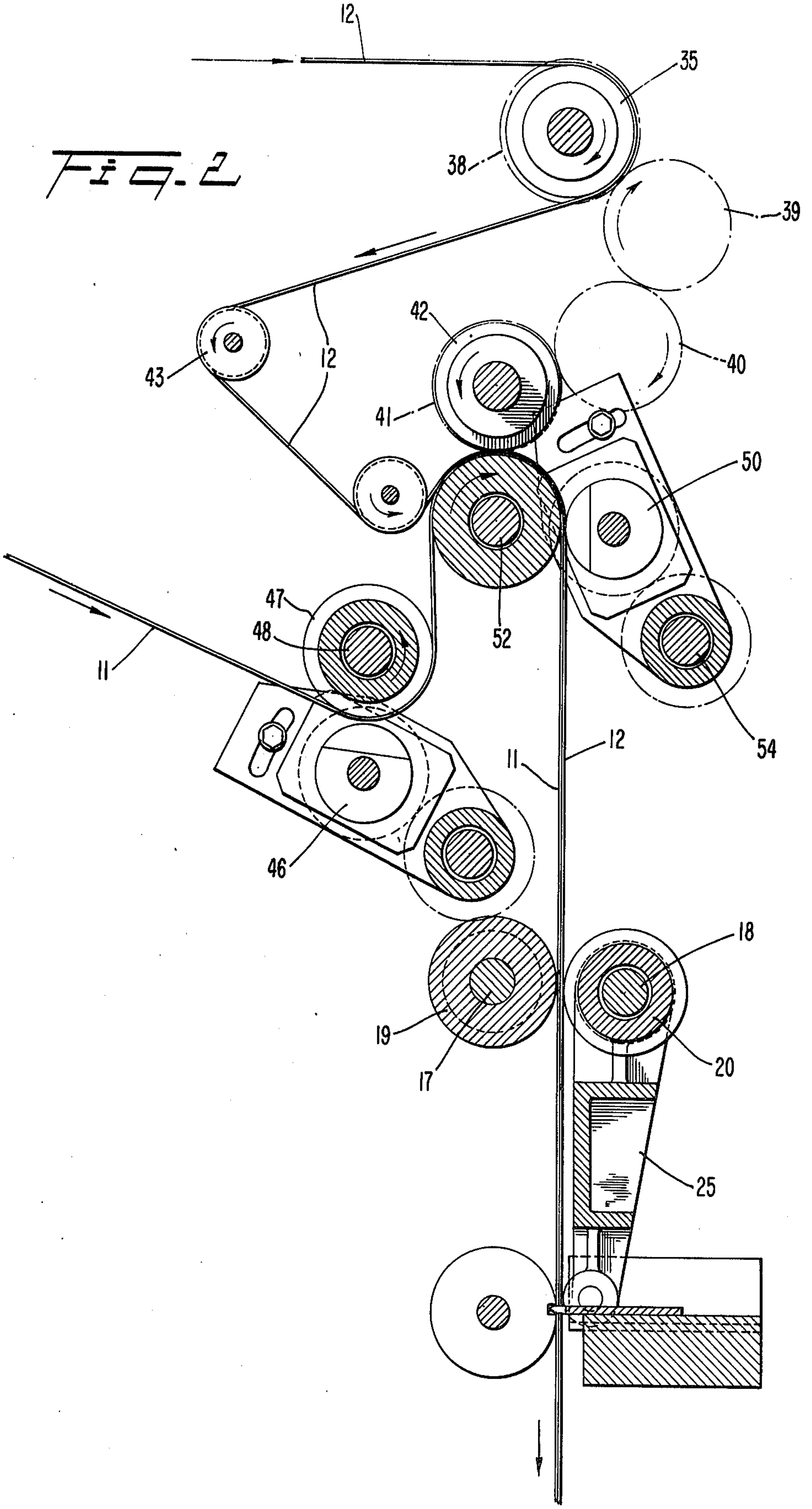
FIG. 2 is a fragmentary sectional view along line 2—2 of FIG. 3.
Figure 3:
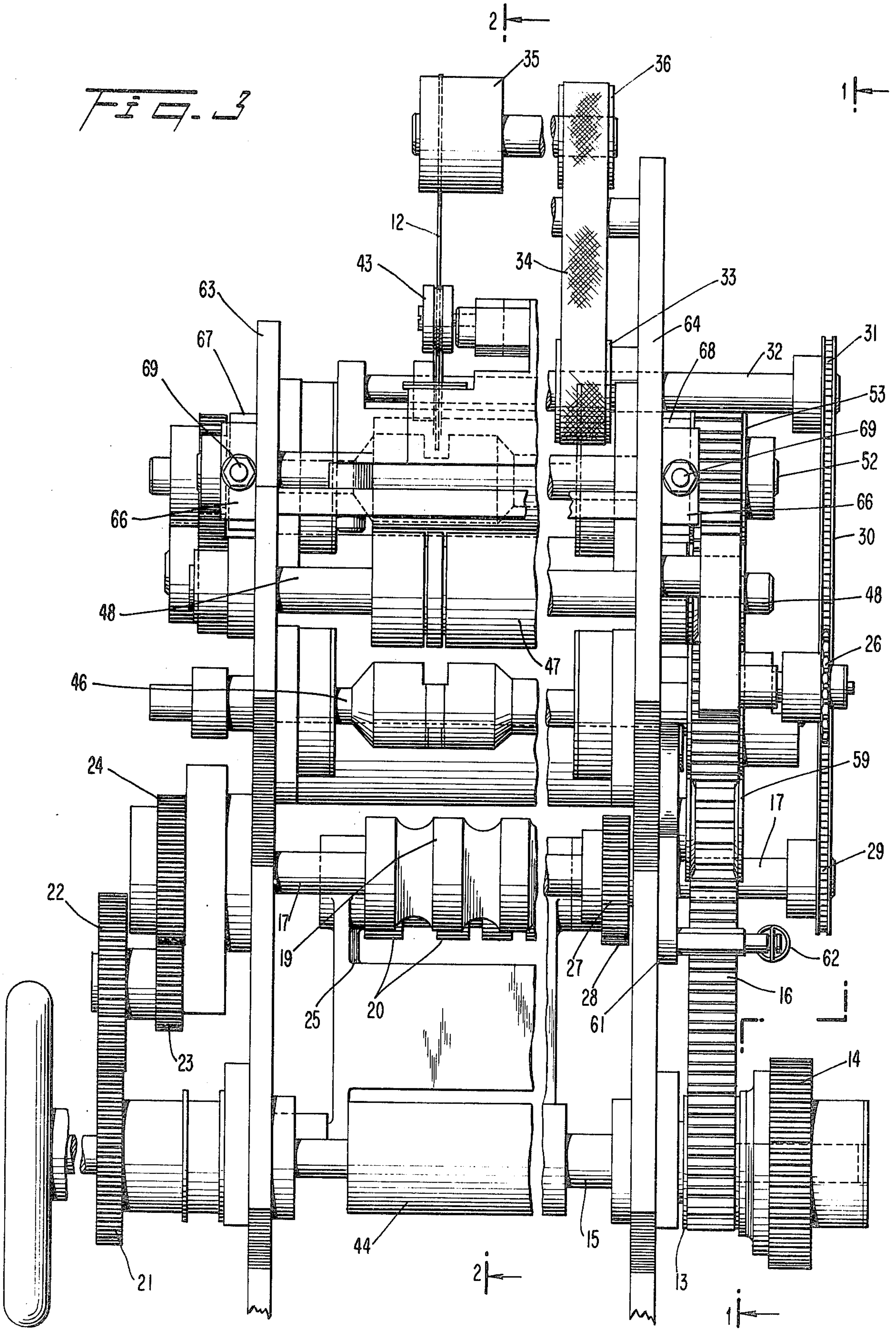
FIG. 3 is an elevational view looking from the left-hand side of FIG. 1.
Figure 4:
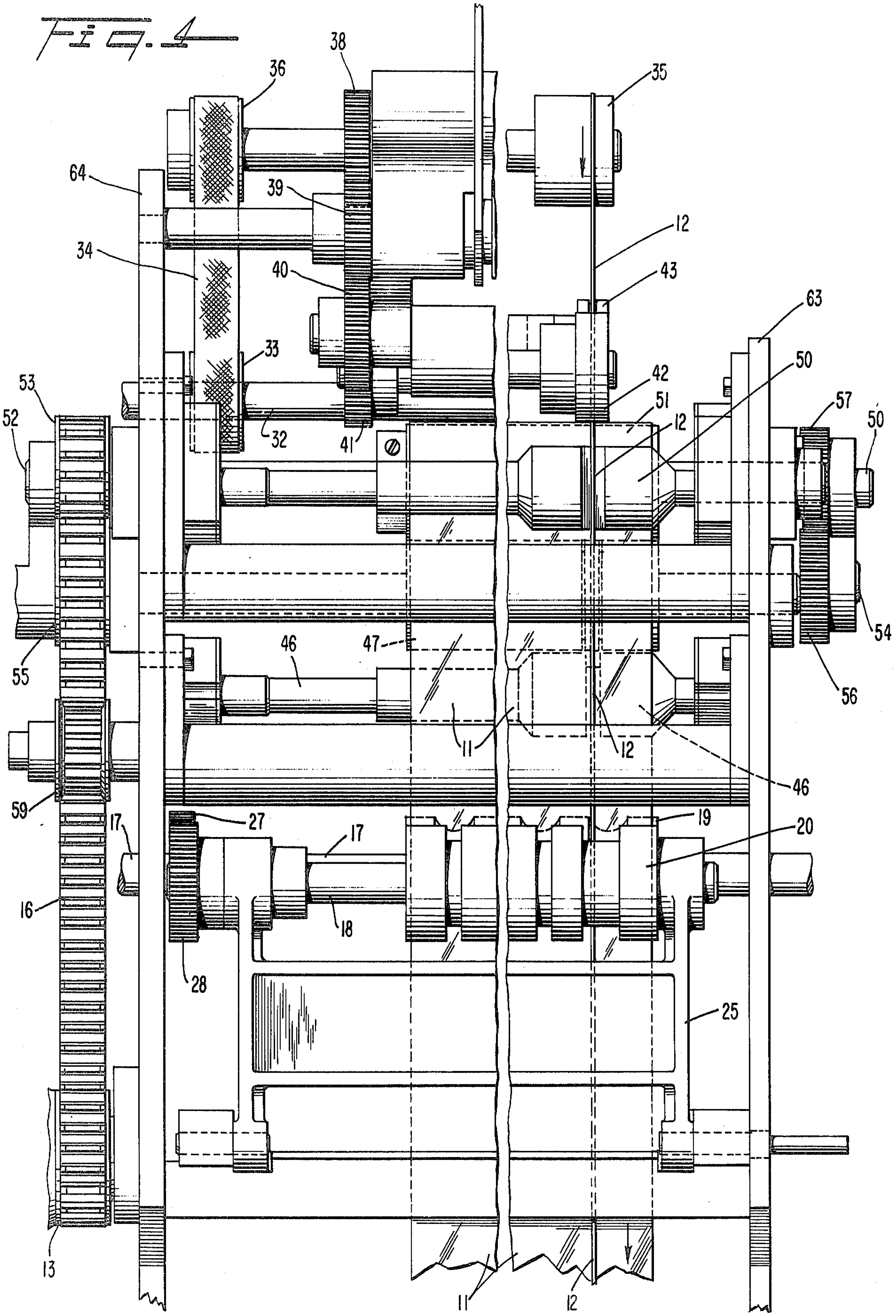
FIG. 4 is an elevational view looking from the right-hand side of FIG. 1.

More specifically, referring to the drawings, a feeding and cutting mechanism, generally designated 10, cuts and feeds a film 11 having a tear tape 12 superimposed thereon. A continuous, closed loop timing belt 16 is used to drive the various operating rollers off the main drive pulley 13. A rotary knife 44 and pulley 13 are mounted on the shaft 15 driven by the main drive gear 14. A clutch (not shown) acts on shaft 15 for engaging and disengaging the head mechanism to the main drive of the wrapping machine.

The gear assembly 21, 22, 23 and 24 constitutes the mechanism for driving a draw roller 19 mounted on shaft 17. Idler rollers 22 and 23 are mounted between the drive gear 21 and driven gear 24. Gear 21 is changeable when it is necessary to change the diameter of the draw rollers depending upon the length of sheet desired. As the draw roller 19 rotates, sheets are brought into position for the cutter blade 17 to completely sever the web of material 11. Gears 27 and 28 maintain the desired rolling relationship between the tension roller 20 mounted on shaft 18 and the draw roller 19. As shown and described, rollers 19 and 20 constitute a pair of feed rollers mounted in the feeding and cutting mechanism 10 to cause the film or web 11 to be drawn downwardly within a vertical plane. The frame member 25 maintains the tension roller 20 in position against the draw roller 19.

A chain sprocket 29 is mounted at the end of shaft 17 and drives a chain 30. A driven sprocket 31 mounted on shaft 32 carries belt pulley 33. The timing belt 34 is used to drive the tear tape draw roller 35 by a driven belt pulley 36. An idler sprocket 26 maintains proper tension in the chain 30. Chain 30 operates glue pot 37 and glue pot roller 43 through the driven sprocket 31. The gear train mechanism including gears 38, 39, 40 and 41 are used to operate a tear tape pressure roller 42.

Feeding and cutting head 10 includes two cutting assemblies for the tear tape cutting operation. Each cutting assembly includes a rotatively mounted knife member and a backing roller. The use of an H-knife cutting edge and a U-knife cutting edge is well known. In this specific embodiment, an H-knife cutting head may be mounted on shaft 46 for cutting against the backing roller 47 mounted on shaft 48. The U-knife shaft 50 carries a U-knife cutting edge (not shown) operating against the backing roller 51 removably mounted on shaft 52. The roller 51 is a cylindrical sleeve member that is fixed to shaft 52 via a driving collar as shown in FIG. 6. The driven pulley 53 mounted on shaft 52 rotates the backing roller 51 in a one-to-one relationship with the main belt pulley 13 and main drive gear 14. The shaft 54 is belt driven at one end via the drive pulley 55 and carries a drive gear 56 at the other end thereof. The driven gear 57 rotates shaft 50 for operating the U-shaped cutting knife. The cutting knife shafts 46 and 50 are mounted in an adjustable manner on brackets in a well-known conventional manner.

In summary, the timing belt 16 drives the rotating shafts 46, 48, 52 and 54 from shaft 15. An idler belt pulley 59, an adjustable tightener 60 and a spring-loaded tightener 61 with spring 62 are used to maintain the belt 16 in its driving condition. The use of the timing belt 16 constitutes one feature of the present invention. The basic location of the various cutting shafts and backing roller shafts does not form a part of the invention but is well known and corresponds substantially to the applicant's earlier U.S. Pat. No. 2,837,978 which has been incorporated by reference herein. These various elements are all rotatably mounted in the frame plates 63 and 64 which are laterally disposed with respect to each other on either side of the wrapping machine.

A further feature of the invention is the manner in which the backing roller 51 is mounted. That is, the backing roller is mounted to resiliently float in the retainer blocks 67 and 68 disposed at either end of the shaft 52. Retainer blocks 67 and 68 contain bearing members 72 in which the shaft 52 is rotatably mounted. A hub portion 70 is located on the retainer blocks 67 and 68 and disposed in the opening 71 located in the frame plate 63 and 64. The opening 71 is oversized so that the retainer blocks 67 and 68 are movably disposed in a direction transverse to a plane extending through the axis of the U-knife cutting shaft and, as is evident, said direction is transverse to the vertical plane within which film or web 11 is fed 50. In this embodiment, the direction is coextensive with the line through the axes of shafts 50 and 52.

A stud member 69 is fixed at one end to the retainer block 68 and extends through a fixably mounted mounting block 66 fixedly disposed on frame plates 63 and 64. Mounting block 66 provides an abutment surface facing blocks 67 and 68. A Belleville washer 65 is disposed around stud member 69 between the abutment surface of mounting block 66 and each of the retainer blocks 67 and 68 as shown. The retainer blocks 67 and 68 are constructed of bronze while the plates 63 and 64 are composed of steel. This relationship has enhanced the wearing capacity of the retainer blocks 67 and 68.

The circumference of the roller 51 is in a one-to-one relationship with respect to the sheet length. Consequently, the knife will cut in fixed definite spots upon each revolution of the backing roller 51. In this situation, the knife edge stands up longer. Furthermore, when the cutting operation takes place in the same location along the circumferential surface of the backing roller 51 any error is eliminated with respect to cutting through the thickness of the film. When the knife is changed, a new spot for cutting on the circumferential surface of backing roller 51 is found.

In the prior art, the knife edge cuts the film in various locations around the peripheral surface of the backing roller. This location depends upon the ratio between the length of the sheet being cut and the circumference of the roller. The gears driving the roller would have to have the same number of teeth with uniform pitch and the circumference of the backing roller would have to have the same length as the actual length of the sheet. This is not done in the prior art. Consequently, there is a hunting or variable location of the cutting operation being effective between the cutting edge and the backing roller.

Several advantages result through the maintaining of the appropriate relationship between the actual length of the sheet being cut and the circumference of the backing roller. When it is necessary to change the length of the sheet, the backing roller will be changed. The axial location of the roller is changed by adjustment of mounting block 66 so that the sheet of material is always to be cut in the same space location between backing roller 51 and the associated U-shaped knife. That is, in the vertical feeding and cutting mechanism shown, the film 11 is to be maintained in the same vertical plane. Consequently, the backing roller 51 is mounted both to resiliently float and be adjustable. The floating characteristics of the backing roller 51 perform a slight movement when the knife edge cuts into the film 11 being severed. This functional relationship between the floating backing roller 51 and the cutting knife increases the life of the cutting edge and enhances the accuracy and efficiency of the cutting operation.

The floating backing roller 51 is of primary importance when there are longitudinally extending cuts which are parallel to the tear tape superimposed on the web 11. Thus the U-shaped knife when used by itself is used against the resiliently floating backing roller 51. In those instances where an H-shaped knife is used, the transverse cut is made by a cutting edge mounted on shaft 46 and cuts against the backing roller 47. This transverse cut is parallel to the axis of backing roller 47 mounted on shaft 48 and is essentially a point contact with respect to the circumference. However, the parallel cuts made on either side of the tear strip 12 require a longer period of contact between the film and cutting edge. Therefore, these parallel cuts are made in conjunction with the backing roller 51. The same advantages associated with the U-shaped knife are then applied to the H-shaped knife cuts.

The use of a continuous timing bolt to drive the backing rollers and drive gear in a one-to-one relationship becomes a very important factor. It is necessary to have this type of relationship established so that the cuts are made in the same spot of the circumferential surface of the backing rollers. The invention includes the use of a set of backing rollers each having a size corresponding to the desired length of sheet being cut by the mechanism. In a specific embodiment, the radius $R_1$ of the rotatably mounted cutting means is equal to the radius $R_2$ of the axis of rotation of the backing roller 51.

While the mechanism for cutting sheets from a continuous web of film has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. An assembly for a sheet feeding and cutting mechanism used to cut sheets from a web of material having a tear strip superimposed thereon, said assembly comprising:

(a) a pair of feed rollers mounted in said mechanism to cause said web to be drawn downwardly within a vertical plane, (b) means for removably mounting a selected one of a plurality of interchangeable backing roller members having a different radius with respect to each other to rotate about a longitudinal axis of rotation within said mechanism, (c) first cutting means having a cutting edge and a longitudinal axis of rotation, (d) means for rotatably mounting the first cutting means in said mechanism to be adjustably disposed parallel to the axis of rotation of said selected one of the roller members, and (e) means for rotating the selected one of the roller members and the cutting means in a fixed relationship with respect to each other to cause the cutting edge to cut the tear strip at substantially the same circumferential surface location on said backing roller member upon each revolution of the first cutting means, (f) said means for removably mounting said roller member being effective to cause said roller member to resiliently float in a direction transverse to said vertical plane, (g) said means for removably mounting said roller member being further effective to maintain said web in said vertical plane regardless of which one of said plurality of roller members is selected, and (h) second cutting means located below said pair of feed rollers to effect cutting of a sheet from the web.

2. An assembly as defined in claim 1 wherein said removably mounting means includes slidably disposed retainer blocks and bearing means, said blocks rotatively support said roller member and, biasing means urge the retainer blocks in said transverse direction toward the cutting means.

3. An assembly as defined in claim 2 wherein said removably mounting means includes an abutment means and, said biasing means includes a spring member disposed between the abutment means and the block.

4. An assembly as defined in claim 3 wherein the spring member is a spring washer.

5. An assembly as defined in claim 1 wherein the radius of the cutting means from the cutting edge to its axis of rotation is equal to the radius of said backing roller member.

6. An assembly as defined in claim 1 wherein timing belt means rotatively drives the cutting means and said backing roller member in a one-to-one relationship.

7. An assembly as defined in claim 1 wherein timing belt means rotatively drives the cutting means and said backing roller member in a multiple of a one-to-one relationship.

8. An assembly as defined in claim 1 wherein said timing belt means is effective to rotate the first cutting means in a one-to-one relationship with respect to said second cutting means.

* * * * *